Sept. 27, 1938.　　　　　M. LYNN　　　　　2,131,110
TRAILER
Filed Nov. 26, 1937
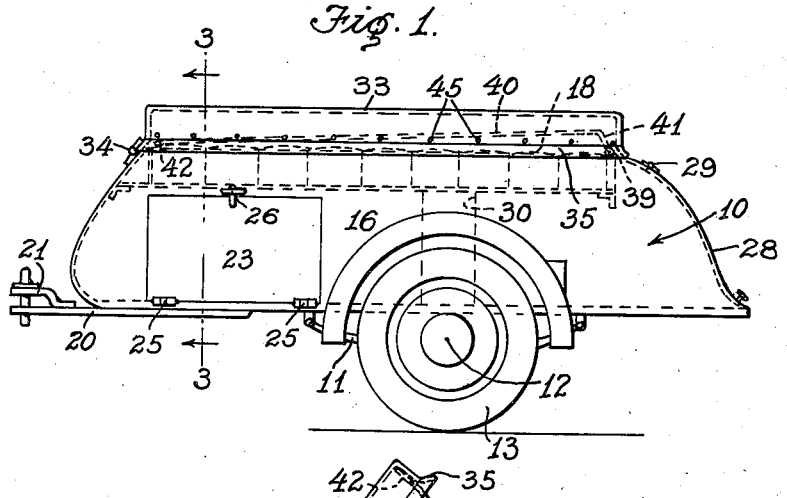
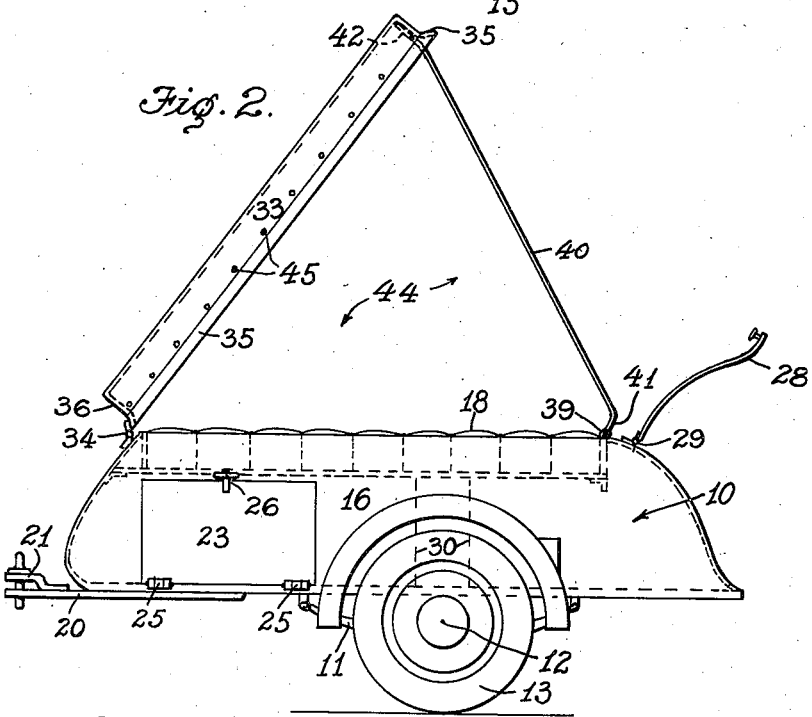
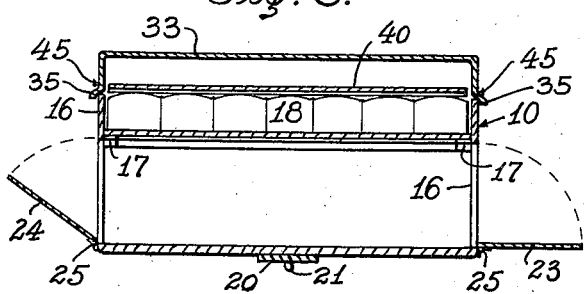
INVENTOR.
Moore Lynn
BY
Jacob J. Kogan
ATTORNEY.

Patented Sept. 27, 1938

2,131,110

UNITED STATES PATENT OFFICE 2,131,110

TRAILER

Moore Lynn, Santa Monica, Calif.

Application November 26, 1937, Serial No. 176,715

2 Claims. (Cl. 296—23)

The present invention relates to improvements in automobile trailers, primarily used as camping equipment, and more particularly pertains to a box-type trailer which is provided with a sleeping space or berth and with various compartments which may be utilized for the storage of different accessories necessary or desirable during camping trips.

The principal object of the present invention is to provide a body, mounted on wheels, to be drawn preferably as a trailer by the leading vehicle, said body containing a sleeping compartment or berth with a mattress and/or springs, and with various other compartments which may be used for the storage of different accessories necessary, expedient or desirable on camping trips.

More specifically stated, the present invention covers an automobile trailer which, when the top thereof is lowered and in condition for travel, does not prevent rear view over such trailer, but which, when opened, provides a sleeping compartment or berth for at least two persons, said trailer being so constructed that the roof is water-tight. The trailer constituting the object of the present invention is also provided with various compartments preferably or principally situated below or under the mattress, or bed proper, said compartments being utilized for various purposes, such as storage of baggage, kitchen utensils, stove, water tank, etc.

As stated above, the main object of the present invention resides in providing a box-type body which is equipped with a sleeping compartment or berth and which is provided with means which when in closed position form the lid closing over the sleeping equipment, and which, when in open position comprise a roof which is water-tight, thus protecting the occupants of the bed from rain, etc. For this purpose, the top of the trailer body is provided with two covers or lids which are, respectively, hinged to the opposite ends of the body. More specifically stated, the trailer body is equipped with a cover or lid which is hinge-connected to one end of said trailer body and which is designed so as to cover or enclose the upper or mattress-containing portion of the trailer. A second lid or cover is hinge-connected to the opposite end of the trailer body, said second lid being so designed that, when in folded position, it may be placed over the mattress and be closed by the first-mentioned lid, but when in open position, said second lid may be raised and be attached to the outer edge of the first lid or cover so as to form a roof over the bed compartment, the two lids being designed so that there is a substantially water-tight connection at the place where they are joined when in distended or open position.

With the above and other ends in view, the accompanying drawing illustrates such instances of adaptation as will disclose the broad underlying features of my invention without limiting to the specific details shown thereon and described therein. In the drawing similar characters of reference indicate and relate to the corresponding parts in the several views which are as follows:

Figure 1 is a side elevation of the trailer with the top lowered ready for travel.

Figure 2 is a similar side elevation of the trailer, but with the covers raised and the bed compartment ready for occupancy; and Figure 3 is a section along line 3—3 of Figure 1.

In constructing and operating the present trailer, I may use whatever alternative or equivalent structural expedients which the exigencies of varying conditions may demand, this without departing from the broad spirit of the invention, or from the scope of the invention as disclosed herein and claimed hereinbelow.

Referring more specifically to the accompanying drawing, I may use any desirable form of frame or chassis 10, which is supported on a pair of springs 11, attached to the axle 12, which in turn carries the usual wheels 13. The chassis 10, broadly stated, is divided into two parts, the upper of which comprises the bed compartment or berth, while the lower provides space which is employed for storage of baggage, cooking equipment, water tank, stove, refrigerator, etc. For the purpose of this division, the inside walls 16, of the chassis 10, are provided with brackets 17, or the like, which support the mattress 18.

As shown in Figures 1 and 2, numeral 20 represents a forwardly extending shank having a pin and socket (or slot) structure 21 thereon for engagement with a corresponding structure (not shown) carried by the lead vehicle. Since this means for attachment of the trailer to the lead vehicle does not constitute any part of the present invention, and since many different types of hitches, whether of the rigid, or ball and socket, or pin and slot type, may be employed, I do not deem it necessary to describe further the specific means for such attachment, particularly since the body of the trailer may be placed directly in, or made part of, an automobile or like structure.

The lower portion of the trailer body 10, as stated, is used for storage. For this purpose, I may provide side walls 16, with doors 23, 24, which may be hinged as at 25 and be equipped with knobs or locks 26. The number of such compartments, obviously, may vary with the needs. The rear side of the trailer body may be equipped with a curved closure 28 which fits over said end of the trailer and which may be hinged thereto as at 29. The interior of the trailer, exposed by the raising of said cover 28, may be used to hold the stove and various cooking utensils and equipment. The lower portion of said trailer body may also contain compartments, such as 30, for water, gas, refrigerator, etc.

Referring now to that phase of the invention which constitutes its main object, the upper portion of the trailer body 10, is provided with a lid 33, which is adapted to cover over the opening containing the mattress 18. This lid 33 is hinged, as at 34, to the front end of the body 10, and is provided with means 35, to seat over and enclose the upper edges of the side walls 16, of the trailer body. This lid 33 is arcuated, as indicated by numeral 36, this being for a purpose more fully described hereinbelow. When in the position shown in Figure 1, this lid 33 thus tightly covers over the mattress containing opening in the trailer body 10.

At the end opposite to that at which said lid 33 is hinged to the body 10, I provide another hinge-connection 39, to which I attach a second or inner lid 40, which is also preferably arcuated at or near its hinged end (as indicated by 41). The outer end 42 is also slightly bent to conform to the inside wall at the outer end of lid 33. When the trailer is in the closed position shown in Figure 1, lid 40 rests on the mattress 18 underneath the outer lid 33.

When the trailer is to be used for sleeping quarters, as when the lead vehicle has stopped for the night, the top or lid 33 is elevated to the position shown in Figure 2, and the inner lid 40 is also raised until its end 42 abuts against the inner wall of the outer end of said lid 33 thereby forming a gable type roof. The arcuated portions 36 and 41 of the two lids 33 and 40, respectively, prevent any rain, etc., from entering at the hinged connections 34 and 39. The tight fit between the outer ends of said lids, at the separable joint at the ridge of the gable roof when in the position shown in Figure 2, also prevents rain and other elements from entering the sleeping compartment and protects the occupants of said sleeping compartment from inclement weather.

Obviously, many modifications may be made without deviating from the scope of the present invention. Thus, side curtains may enclose the side openings 44, as by connecting such side curtains to the buttons 45 on the lid 33, and to similar buttons on lid 40 and sides 16 of the trailer body 10. Clearly, such side curtains may be equipped with windows, which may be of glass, Celluloid, screen, or the like. Similar windows may also be provided in the inner lid 40. Furthermore, the trailer may be provided with additional sleeping means, such as additional springs and/or mattresses, which may be hinged to the side walls 16 and which may be swung into travelling position under lid 33, and then outwardly to extend over the wheels when they are to be used. Clearly, any suitable supporting means should be used for such additional cots.

I claim:

1. A trailer comprising a body portion provided with wheels and open at its upper side, a movable cover member for said body hingedly connected at one end to the body, and a second movable cover member connected at one end to the body at a point remote from the hinged connection of the first movable cover member, the two cover members being elevated and brought together to form a gable type roof over said body portion through the means of a separable joint between the non-hinged ends of said cover members at the ridge of the gable roof, said cover members being adapted to be lowered when said joint is disconnected.

2. A trailer according to claim 1 wherein one cover member is adapted to be folded under the other cover member when the parts are lowered.

MOORE LYNN.